United States Patent
Zhu et al.

(10) Patent No.: US 11,893,744 B2
(45) Date of Patent: Feb. 6, 2024

(54) METHODS AND APPARATUS FOR EXTRACTING PROFILES FROM THREE-DIMENSIONAL IMAGES

(71) Applicant: Cognex Corporation, Natick, MA (US)

(72) Inventors: Hongwei Zhu, Natick, MA (US); Nathaniel Bogan, Natick, MA (US); David J. Michael, Waban, MA (US)

(73) Assignee: Cognex Corporation

( * ) Notice: Subject to any disclaimer, the term of this patent is extended or adjusted under 35 U.S.C. 154(b) by 46 days.

(21) Appl. No.: 17/316,417

(22) Filed: May 10, 2021

(65) Prior Publication Data

US 2021/0350615 A1 Nov. 11, 2021

Related U.S. Application Data

(60) Provisional application No. 63/023,179, filed on May 11, 2020.

(51) Int. Cl.
  *G06T 17/00* (2006.01)
  *G06T 7/12* (2017.01)
  *G06F 18/2134* (2023.01)

(52) U.S. Cl.
  CPC .......... *G06T 7/12* (2017.01); *G06F 18/21345* (2023.01); *G06T 17/00* (2013.01)

(58) Field of Classification Search
  None
  See application file for complete search history.

(56) References Cited

U.S. PATENT DOCUMENTS

| | | | | |
|---|---|---|---|---|
| 5,114,236 A | * | 5/1992 | Matsugu | G03F 9/7076 250/548 |
| 6,992,773 B1 | * | 1/2006 | Bruce | G01N 21/95684 356/450 |
| 9,536,339 B1 | * | 1/2017 | Worley | G06T 17/00 |
| 10,699,444 B2 | * | 6/2020 | Mammou | G06T 7/50 |
| 11,030,763 B1 | * | 6/2021 | Srivastava | G06K 9/6292 |

(Continued)

OTHER PUBLICATIONS

Petras et al., Processing UAV and lidar point clouds in grass GIS, The International Archives of Photogrammetry, Remote Sensing and Spatial Information Sciences, 41 (2016): 945 (Year: 2016).*

(Continued)

*Primary Examiner* — Anh-Tuan V Nguyen
(74) *Attorney, Agent, or Firm* — Wolf, Greenfield & Sacks, P.C.

(57) ABSTRACT

The techniques described herein relate to methods, apparatus, and computer readable media configured to determining a two-dimensional (2D) profile of a portion of a three-dimensional (3D) point cloud. A 3D region of interest is determined that includes a width along a first axis, a height along a second axis, and a depth along a third axis. The 3D points within the 3D region of interest are represented as a set of 2D points based on coordinate values of the first and second axes. The 2D points are grouped into a plurality of 2D bins arranged along the first axis. For each 2D bin, a representative 2D position is determined based on the associated set of 2D points. Each of the representative 2D positions are connected to neighboring representative 2D positions to generate the 2D profile.

23 Claims, 15 Drawing Sheets

(56) References Cited

U.S. PATENT DOCUMENTS

| | | | | |
|---|---|---|---|---|
| 2004/0153671 | A1* | 8/2004 | Schuyler | G07C 9/28 726/9 |
| 2009/0232388 | A1* | 9/2009 | Minear | G06T 3/0075 382/154 |
| 2011/0310088 | A1* | 12/2011 | Adabala | G06T 19/003 345/419 |
| 2013/0108143 | A1* | 5/2013 | Chang | G06T 7/0006 382/141 |
| 2013/0230206 | A1* | 9/2013 | Mendez-Rodriguez | G01S 7/4802 382/103 |
| 2014/0334670 | A1* | 11/2014 | Guigues | G06V 40/23 382/103 |
| 2015/0199839 | A1* | 7/2015 | Chon | G06T 15/08 345/427 |
| 2016/0234475 | A1* | 8/2016 | Courchesne | H04N 7/157 |
| 2019/0163968 | A1* | 5/2019 | Hua | G06V 20/58 |
| 2020/0090357 | A1* | 3/2020 | Pagé-Caccia | G06N 3/0445 |
| 2020/0191943 | A1* | 6/2020 | Wu | G01S 13/726 |
| 2020/0191971 | A1* | 6/2020 | Hua | G06V 10/764 |
| 2020/0333462 | A1* | 10/2020 | Mellor | G01S 17/88 |
| 2021/0150230 | A1* | 5/2021 | Smolyanskiy | G06V 10/803 |
| 2021/0183093 | A1* | 6/2021 | Park | G06T 7/579 |

OTHER PUBLICATIONS

Mah et al., "3D laser imaging for surface roughness analysis," International Journal of Rock Mechanics and Mining Sciences 58 (2013): 111-117 (Year: 2013).*

International Search Report and Written Opinion dated Aug. 13, 2021 in connection with International Application No. PCT/US2021/031503.

[No Author Listed], Customizable Vision Series XG-X2000 Series, User's Manual. Keyence. Mar. 2018:7 pages.

[No Author Listed], Matrox Imaging Library (MIL) Tools. Matrox Imaging. https://www.matrox.com/en/imaging/products/software/sdk/mil/tools/3D-imaging [last accessed Jun. 25, 2021]. 5 pages.

PCT/US2021/031503, Aug. 13, 2021, International Search Report and Written Opinion.

* cited by examiner

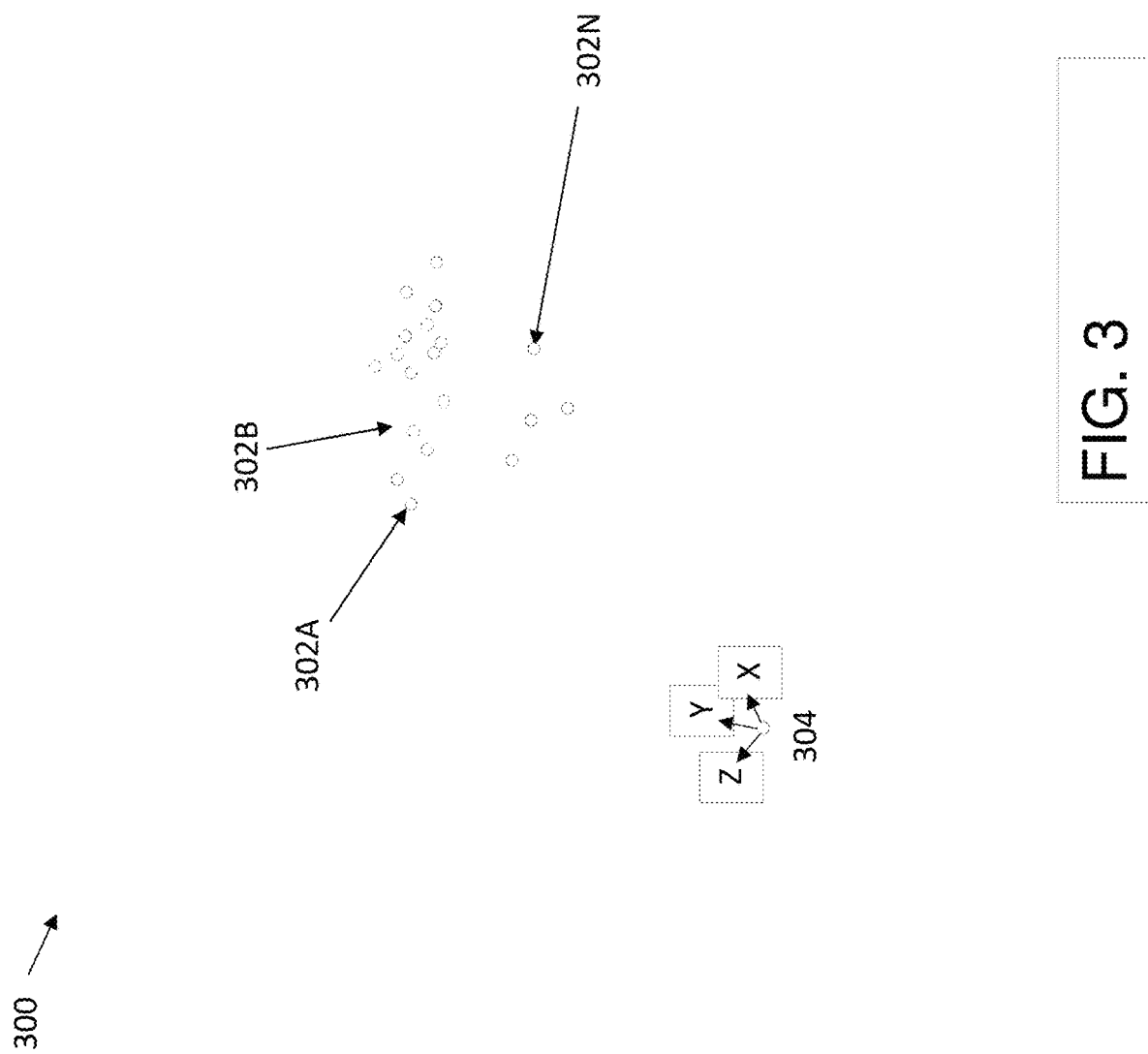

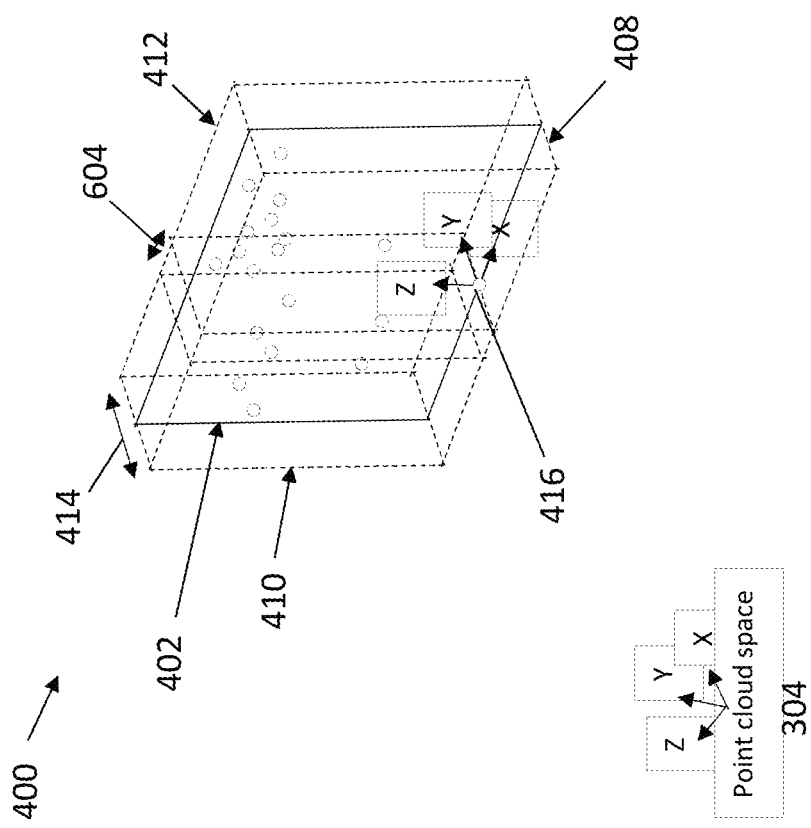

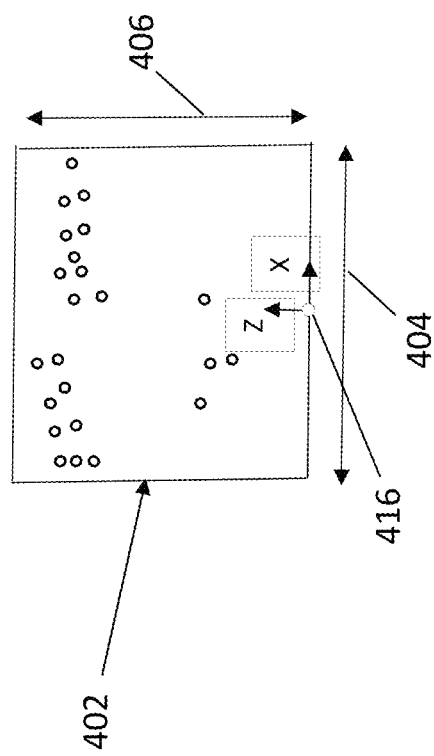

METHODS AND APPARATUS FOR EXTRACTING PROFILES FROM THREE-DIMENSIONAL IMAGES

RELATED APPLICATIONS

This application claims priority under 35 U.S.C. § 119(e) to U.S. Provisional Application Ser. No. 63/023,179, titled "METHODS AND APPARATUS FOR EXTRACTING PROFILES FROM THREE-DIMENSIONAL IMAGES," filed on May 11, 2020, which is herein incorporated by reference in its entirety.

TECHNICAL FIELD

The techniques described herein relate generally to methods and apparatus for machine vision, including techniques for extracting profiles from three-dimensional images, and in particular to extracting profiles from three-dimensional point clouds at arbitrary poses.

BACKGROUND OF INVENTION

Machine vision systems can include robust imaging capabilities, including three-dimensional (3D) imaging devices. For example, 3D sensors can image a scene to generate a set of 3D points that each include an (x, y, z) location within a 3D coordinate system (e.g., where the z axis of the coordinate system represents a distance from the 3D imaging device). Such 3D imaging devices can generate a 3D point cloud, which includes a set of 3D points captured during a 3D imaging process. However, the sheer number of 3D point in 3D point clouds can be massive (e.g., compared to 2D data of a scene). Additionally, 3D point clouds may only include pure 3D data points, and therefore may not include data indicative of relations between/among the 3D points, or other information, such as surface normal information, it can be complicated to process 3D points with no data indicative of relations among other points. Therefore, while 3D point clouds can provide a large amount of 3D data, performing machine vision tasks on 3D point cloud data can be complicated, time consuming, require significant processing resources, and/or the like.

SUMMARY OF INVENTION

In accordance with the disclosed subject matter, apparatus, systems, and methods are provided for improved machine vision techniques, and in particular for improved machine vision techniques that generate profiles from points in a 3D point cloud (e.g., of object surfaces). The techniques can generate the profiles at arbitrary poses. According to some embodiments, a plane and/or a region of interest, which can be user-specified, is used to generate each profile. The region of interest can be a 3D region of interest, such that 3D points within the region of interest can be collapsed into 2D points, binned, and used to generate the resulting profile.

Some aspects relate to a computerized method for determining a two-dimensional (2D) profile of a portion of a three-dimensional (3D) point cloud. The method comprises receiving data indicative of a 3D point cloud comprising a plurality of 3D points, and determining a 3D region of interest in the 3D point cloud, wherein the 3D region of interest comprises a width along a first axis, a height along a second axis, and a depth along a third axis. The method comprises determining a set of 3D points of the plurality of 3D points that each comprises a 3D location within the 3D region of interest, representing the set of 3D points as a set of 2D points based on coordinate values of the first and second axes of set of the 3D points, and grouping the set of 2D points into a plurality of 2D bins arranged along the first axis, wherein each 2D bin comprises a bin width. The method comprises determining, for each of the plurality of 2D bins, a representative 2D position based on the associated set of 2D points, and connecting each of the representative 2D positions to neighboring representative 2D positions to generate the 2D profile.

According to some examples, the method further includes creating a 3D region coordinate system comprising the first axis, the second axis, and the third axis, wherein an origin of the 3D region coordinate system is disposed at a middle of the width and depth of the 3D region, and the height of the 3D region starts at the origin. The method can further include mapping points from a coordinate system of the 3D point cloud to the 3D region coordinate system.

According to some examples, representing the set of 3D points as the set of 2D points comprises representing the 3D points in a 2D plane comprising a first dimension equal to the width and a second dimension equal to the height, wherein the first dimension extends along the first axis and the second dimension extends along the second axis. Representing the set of 3D points as the set of 2D points can include setting each value of the third axis of the set of 3D points to zero. The plurality of 2D bins can be arranged side-by-side along the first axis within the first dimension of the 2D plane.

According to some examples, determining a representative 2D position for each of the plurality of 2D bins comprises determining the set of 2D points of one or more 2D bins of the plurality of 2D bins is less than a threshold, and setting the set of 2D points of the one or more 2D bins to an empty set.

According to some examples, determining the representative 2D position for each of the plurality of 2D bins comprises determining an average of the set of 2D points of each bin.

According to some examples, determining the representative 2D position for each of the plurality of 2D bins comprises selecting a 2D point of the associated set of 2D points with a maximum value of the second axis as the representative 2D position.

According to some examples, determining the representative 2D position for each of the plurality of 2D bins comprises, for each 2D bin, grouping the set of 2D points into one or more clusters of 2D points with distances between values of the second axis of the 2D points of each cluster within a separation threshold, wherein distances between the values of the second axis of the 2D points of different clusters are greater than the separation threshold, removing any clusters with less than a threshold minimum number of 2D points to generate a remaining set of one or more clusters, determining a maximum cluster of the one or more remaining clusters comprising determining which of the one or more remaining clusters comprises a 2D point with a maximum coordinate along the second axis, and averaging the 2D points of the maximum cluster to determine the representative 2D position.

According to some examples, determining the representative 2D position for each of the plurality of 2D bins comprises determining the representative 2D position only for 2D bins of the plurality of 2D bins with non-empty sets of 2D points.

Some embodiments relate to a non-transitory computer-readable media comprising instructions that, when executed by one or more processors on a computing device, are operable to cause the one or more processors to execute the method of any of the techniques described herein.

Some embodiments relate to a system comprising a memory storing instructions, and a processor configured to execute the instructions to perform the method of any of the techniques described herein.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 3 is a diagram showing an example of a 3D point cloud, according to some embodiments.

FIG. 4B is a diagram showing the 3D point cloud from FIG. 3 overlaid with the 3D region of interest in FIG. 4A, according to some embodiments.

FIG. 5 is a diagram showing 3D points projected onto a 2D plane, according to some embodiments.

DETAILED DESCRIPTION OF INVENTION

Figure 1:
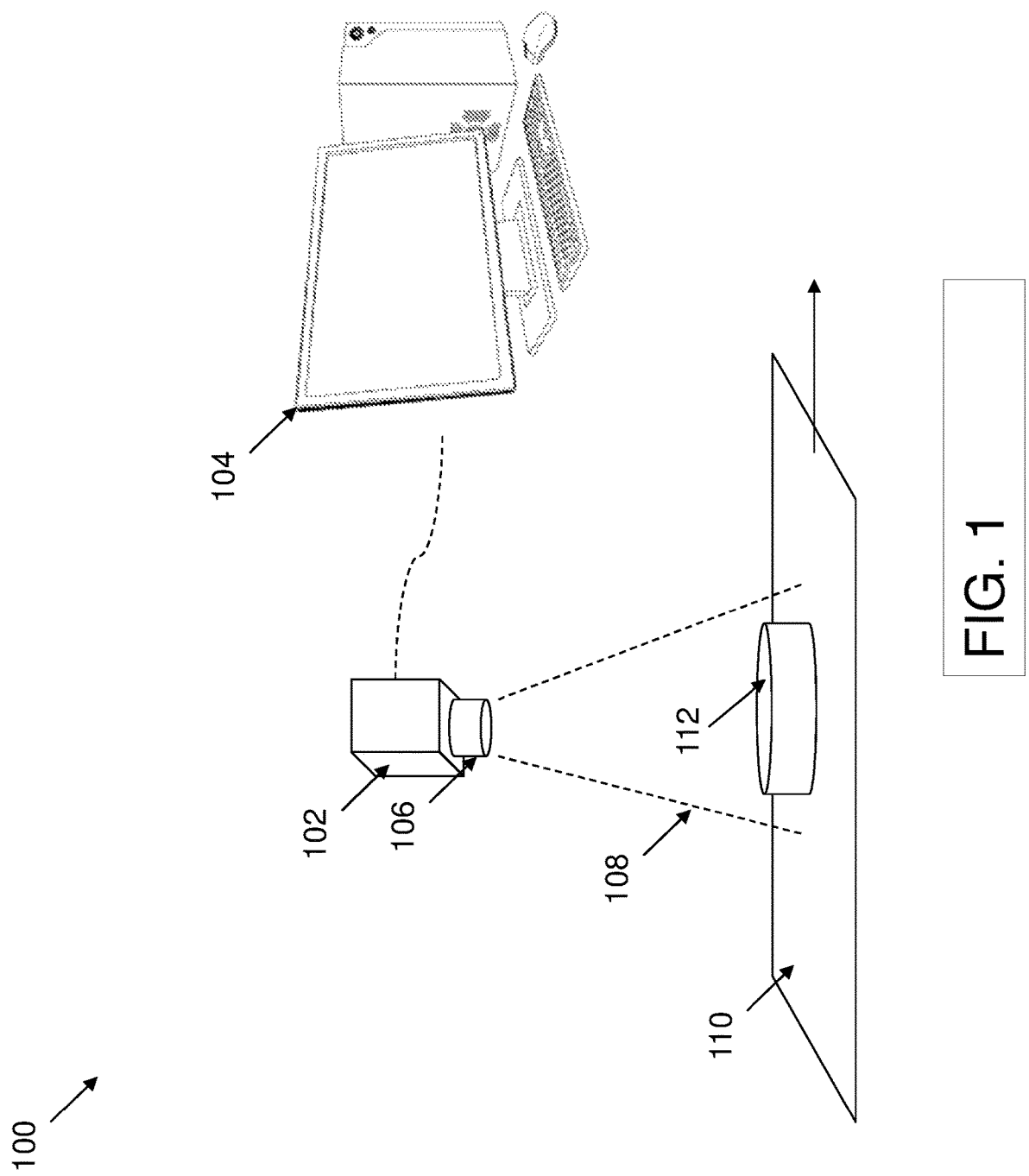
FIG. 1 is a diagram showing an exemplary machine vision system, according to some embodiments.

The techniques described herein provide for data reduction techniques that can be used to analyze 3D point cloud images. 3D point clouds provide popular representations of object surfaces under inspection using 3D point positions. However, 3D point clouds often include hundreds of thousands or millions of (x, y, z) points. Therefore, the inventors have appreciated that directly interpreting such a massive number of 3D points in space can therefore be quite time consuming and resource intensive. For example, since 3D point clouds include such massive numbers of 3D points and typically do not include information about structural or spatial relationships among the 3D points, trying to interpret a pure 3D point cloud can be infeasible for many machine vision applications, which may have limited time to perform such interpretations, limited hardware resources, and/or the like. Therefore, conventional techniques typically first mesh the 3D points to generate surfaces along the 3D points, and then perform geometrical operations based on the meshed surfaces. However, meshing the 3D points can require performing complex operations. Further, the resulting mesh surfaces can include noise artifacts (e.g., due to noisy 3D points that do not lie along the actual surface of the imaged objects).

The inventors have developed technological improvements to machine vision techniques to address these and other inefficiencies. The techniques described herein can extract point cloud profiles directly from 3D point clouds at arbitrary poses and produce one-dimensional (1D) signals (e.g., of object surfaces). According to some embodiments, each 1D signal can be represented as an ordered sequence of 2D points in a 2D plane. A 3D shape, such as a 3D rectangular shape, that is dimensioned based on the 2D plane can specify how neighboring 3D points in the 3D point cloud are used to produce the profile. The 3D points within the 3D shape can be binned and processed as clusters of 3D points in order to smooth and reduce noise in the 3D points.

According to some embodiments, the techniques can include projecting the 3D points near or within the 3D shape as 2D points on the 2D plane, and quantizing the projected 2D points into bins. Representative positions can be determined for each bin, and the representative positions of adjacent bins can be connected to generate polylines. Since the traditionally massive amount of data in a 3D point cloud can be reduced to one or two dimensions, the techniques described herein can significantly improve performance. The techniques can be used in various types of point cloud-based applications, including feature extraction, metrology measurements, defect inspection, vision guided robots, and/or the like.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary machine vision system 100, according to some embodiments. The exemplary machine vision system 100 includes a camera 102 (or other imaging acquisition device) and a computer 104. While only one camera 102 is shown in FIG. 1, it should be appreciated that a plurality of cameras can be used in the machine vision system (e.g., where a point cloud is merged from that of multiple cameras). The computer 104 includes one or more processors and a human-machine interface in the form of a computer display and optionally one or more input devices (e.g., a keyboard, a mouse, a track ball, etc.). Camera 102 includes, among other components, a lens 106 and a camera sensor element (not illustrated). The lens 106 includes a field of view 108, and the lens 106 focuses light from the field of view 108 onto the sensor element. The sensor element generates a digital image of the camera field of view 108 and provides that image to a processor that forms part of computer 104. As shown in the example of FIG. 1, object 112 travels along a conveyor 110 into the field of view 108 of the camera 102. The camera 102 can generate one or more digital images of the object 112 while it is in the field of view 108 for processing, as discussed further herein. In operation, the conveyor can contain a plurality of objects. These objects can pass, in turn, within the field of view 108 of the camera 102, such as during an inspection process. As such, the camera 102 can acquire at least one image of each observed object 112.

In some embodiments, the camera 102 is a three-dimensional (3D) imaging device. As an example, the camera 102 can be a 3D sensor that scans a scene line-by-line, such as the DS-line of laser profiler 3D displacement sensors available from Cognex Corp., the assignee of the present application. According to some embodiments, the 3D imaging device can generate a set of (x, y, z) points (e.g., where the z axis adds a third dimension, such as a distance from the 3D imaging device). The 3D imaging device can use various 3D image generation techniques, such as shape-from-shading, stereo imaging, time of flight techniques, projector-based techniques, and/or other 3D generation technologies. In some embodiments the machine vision system 100 includes a two-dimensional imaging device, such as a two-dimensional (2D) CCD or CMOS imaging array. In some embodiments, two-dimensional imaging devices generate a 2D array of brightness values.

In some embodiments, the machine vision system processes the 3D data from the camera 102. The 3D data received from the camera 102 can include, for example, a point cloud and/or a range image. A point cloud can include a group of 3D points that are on or near the surface of a solid object. For example, the points may be presented in terms of their coordinates in a rectilinear or other coordinate system. In some embodiments, other information, such a mesh or grid structure indicating which points are neighbors on the object's surface, may optionally also be present. In some embodiments, information about surface features including curvatures, surface normal, edges, and/or color and albedo information, either derived from sensor measurements or computed previously, may be included in the input point clouds. In some embodiments, the 2D and/or 3D data may be obtained from a 2D and/or 3D sensor, from a CAD or other solid model, and/or by preprocessing range images, 2D images, and/or other images.

According to some embodiments, the group of 3D points can be a portion of a 3D point cloud within user specified regions of interest and/or include data specifying the region of interest in the 3D point cloud. For example, since a 3D point cloud can include so many points, it can be desirable to specify and/or define one or more regions of interest (e.g., to limit the space to which the techniques described herein are applied).

Examples of computer 104 can include, but are not limited to a single server computer, a series of server computers, a single personal computer, a series of personal computers, a mini computer, a mainframe computer, and/or a computing cloud. The various components of computer 104 can execute one or more operating systems, examples of which can include but are not limited to: Microsoft Windows Server™; Novell Netware™; Redhat Linux™, Unix, and/or a custom operating system, for example. The one or more processors of the computer 104 can be configured to process operations stored in memory connected to the one or more processors. The memory can include, but is not limited to, a hard disk drive; a flash drive, a tape drive; an optical drive; a RAID array; a random access memory (RAM); and a read-only memory (ROM).

3D vision systems capture images of scenes by generating 3D point clouds of the scene. When a 3D vision system views an object surface from a given direction, only the visible surfaces are captured in the 3D point cloud, since other surfaces (e.g., side and/or bottom surfaces) are often occluded. As described herein, the techniques provide for estimating 1D manifolds, or profiles, of surfaces in 3D point clouds. A profile can represent, for example, one or more surface curves of the surface of an object in a region of interest of the point cloud.

According to some embodiments, a 3D box is used to identify a set of 3D points in the 3D point cloud. The identified 3D points are mapped to 2D points along a 2D plane associated with the 3D box. The 2D points can be grouped into bins, and a representative point can be computed for each bin. Various techniques can be used to determine the representative points of the bins, including by averaging the 2D positions, identifying maximum 2D points, and/or averaging positions from qualified clusters. The representative points of adjacent bins can be connected to form polylines. According to some examples, each polyline can be made by connecting 2D vertices that increase monotonically along a perpendicular direction of the viewing direction.

Figure 2:
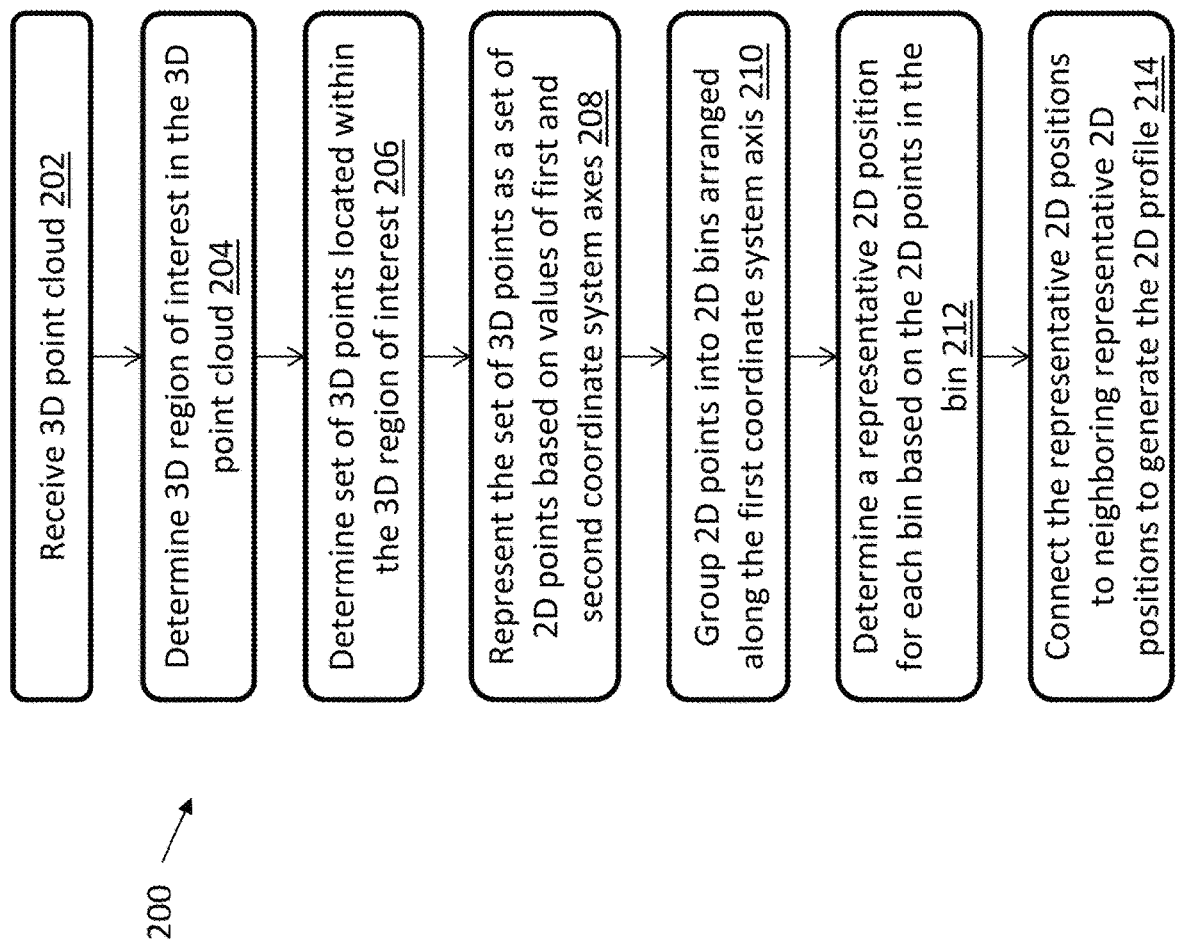
FIG. 2 is a flowchart of an exemplary computerized method for determining a 2D profile of a portion of a 3D point cloud, according to some embodiments.

FIG. 2 is a flowchart of an exemplary computerized method 200 for determining a 2D profile of a portion of a 3D point cloud, according to some embodiments. At step 202, the machine vision system (e.g., the machine vision system 100 of FIG. 1) receives a 3D point cloud that includes a plurality of 3D points. According to some embodiments, the 3D point cloud can be a voxel grid, a 3D lattice, and/or the like. FIG. 3 is a diagram showing an example of a 3D point cloud 300, according to some embodiments. For illustrative purposes, the 3D point cloud 300 only shows a small number of 3D points 302A, 302B, through 302N, collectively referred to as 3D points 302. The 3D point cloud includes a point cloud coordinate system 304 with associated X, Y and Z axes.

At step 204, the machine vision system determines a 3D region of interest in the 3D point cloud. The 3D region can be any 3D shape, such as a 3D box, a sphere, etc. According to some embodiments, the techniques include specifying a cutting plane (e.g., including a projection/sampling direction, a viewing direction in the plane, and/or a region of interest to constrain neighboring points). For example, the cutting plane can be specified in conjunction with a depth that can be used to determine the 3D region of interest.

According to some embodiments, the 3D region can be specified with respect to a 3D region coordinate system. For a 3D box, for example, the 3D region of interest can have a width along a first axis of the coordinate system (e.g., along the X axis), a height along a second axis of the coordinate system (e.g., along the Z axis), and a depth along a third axis of the coordinate system (e.g., along the Y axis). According to some embodiments, the techniques can include constructing a rectilinear coordinate space whose X and Z axes correspond to the width and height of a rectangular region of interest, respectively, and whose Y axis corresponds to a depth of the rectangular region of interest. The region of interest can be specified based on the origin of the 3D region coordinate system. For example, continuing with the example of the rectangular region of interest, the midpoints of the width and depth of the 3D region can be disposed at the origin, and the height of the 3D region can start at the origin (e.g., such that the origin is located at a center of a short side of the 3D region).

Figure 4A:
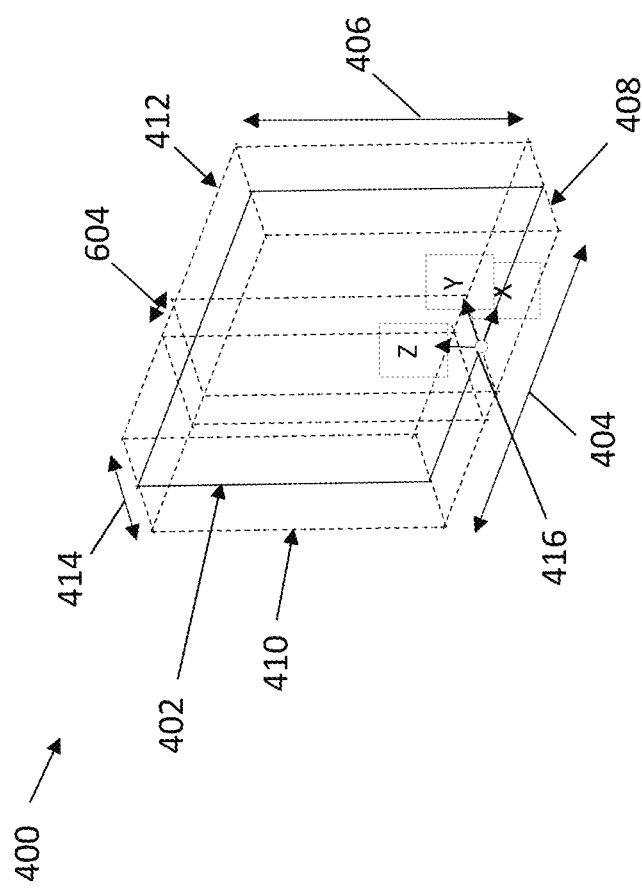
FIG. 4A is a diagram showing an example of a rectangular-shaped 3D region of interest, according to some embodiments.

FIG. 4A is a diagram showing an example of a rectangular-shaped 3D region of interest 400, according to some embodiments. The region of interest 400 can be specified as a 2D rectangle 402, which can be referred to as a cutting rectangle for the region of interest. The width 404 of the rectangle 402 is aligned on the X direction of the 3D region coordinate system, and the height 406 of the rectangle 402 is aligned on the Z direction of the coordinate system. A box 408 is constructed to define the 3D region of interest for identifying the neighboring 3D points from the 3D point cloud. The box 408 includes a front face 410 and back face 412, both of which are a parallel copy of the cutting rectangle 402, and are separated from each other by the thickness 414 along the normal direction of the rectangle 402, and each separated from the rectangle 402 by half of the thickness 414.

As shown in FIG. 4A, the 3D region coordinate system 416 is defined such that its origin is at the center of the bottom side of the rectangle 402, and its X and Z axes respectively are parallel to the width and height of the rectangle 402, respectively, while the Y direction extends along the thickness 414. FIG. 4B shows the 3D point cloud 300 from FIG. 3 overlaid with the 3D region of interest 400 of FIG. 4A, according to some embodiments.

As described herein, the 3D region of interest can be associated with its own region coordinate system, which may be different than the coordinate system of the 3D point cloud 304. According to some embodiments, the techniques can map the 3D points from the 3D point cloud coordinate system to the region coordinate system of the 3D region of interest. Performing such a mapping can obtain each 3D point's projection in the plane where the region of interest lies (e.g., the rectangle 402) while excluding those that are outside of the region of interest. According to some embodiments, a rigid transform can be used to relate the 3D point cloud coordinate space to the 3D region coordinate space. A 3D point in the 3D point cloud space "pointPointCloud" can be transformed to the 3D region coordinate space "Profile" using the transform transformProfileFromPointCloud using Equation 1:

pointInROI=transformProfileFromPointCloud*pointPointCloud    Equation 1 where:
 indicates the compose operator; and
pointInROI is a 3D point within the rectangular 3D region, and meets the following three conditions shown in Equations 2-4:

−rectSize$X$*0.5<=pointInROI.$x$<=rectSize$X$*0.5    Equation 2

0<=pointInROI.$z$ and pointInROI.$z$<=rectSize$Y$    Equation 3

−Thickness*0.5<=pointInROI.$y$ and pointInROI.$y$<=Thickness*0.5    Equation 4

Where:
rectSizeX is the width of the rectangle (e.g., width 404 in FIG. 4A);
rectSizeY is the height of the rectangle (e.g., height 406 in FIG. 4A); and
Thickness is the depth of the rectangle (e.g., depth 414 in FIG. 4A).

At step 206, the machine vision system determines the set of 3D points that are located within the 3D region of interest. According to some embodiments, the machine vision system determines the 3D points within the 3D region of interest based on one or more aspects of the 3D region of interest. For example, referring to FIG. 4B, the machine vision system can determine the 3D points of the 3D point cloud shown within the rectangular 3D region of interest 400 by determining the points within the thickness 414 (e.g., which can be user-specified). Therefore, in this example, a 3D point within the region of interest is a point that has a distance from the plane 402 less than the half of the thickness 414.

At step 208, the machine vision system represents the set of 3D points as a set of 2D points based on coordinate values of the designated first and second axes of set of the 3D points (e.g., for a coordinate form represented by (X,Y,Z), the designated first and second axes can be X and Z, Y and Z, and/or the like). According to some embodiments, each neighboring point is projected to a 2D aspect of the 3D region of interest. According to some embodiments, the 3D points can be represented in a 2D plane. According to some embodiments, the 3D points can be represented as 2D points by representing the 3D points using only two of the three coordinate axes values and/or by setting each value of an axis of the set of 3D points (e.g., the third axis) to zero.

For example, referring to FIG. 4B, the 3D points can be projected to the plane 402 by setting the Y component of each 3D point to zero to obtain in-plane points as shown in FIG. 5, according to some embodiments. As shown in FIG. 5, the first dimension of the plane 402 is maintained to be equal to the width 404, and the second dimension of the plane 402 is also maintained to be equal to the height 406, such that the plane 402 maintains the same dimensions as originally configured and shown in FIGS. 4A-4B. The dimensions of the plane 402 can also be maintained with respect to the 3D region coordinate system. Accordingly, as shown in FIG. 5, the width 404 extends along the X axis of the 3D region coordinate system 416, and the height 406 extends along the Z axis of the 3D region coordinate system 416.

At step 210, the machine vision system groups the set of 2D points into a plurality of 2D bins arranged along the first axis. Each of the 2D bins has a bin width, and in some embodiments each of the 2D bins has the same bin width. Each of the plurality of 2D bins can be arranged side-by-side along the first axis (e.g., along the X axis) within the first dimension of the 2D plane.

For example, if the first axis is the X axis, then the 2D points can be grouped into bins spaced along the X axis by quantizing their X components using Equation 5:

$$\text{quantizedPointInROI} = \text{floor}(\text{pointInROI}.x(\ )/\text{BinSize}) \quad \text{Equation 5}$$

where:
pointInROI is a 3D point within the rectangular region; and
BinSize is the bin size.

As a result, an occupied bin may contain one or more in-plane points. Therefore, in some embodiments, the in-plane position of each 2D point can be assigned to the corresponding bin based on the maximum integer not larger than the ratio: pointInROI.x( )/BinSize.

Figure 6:
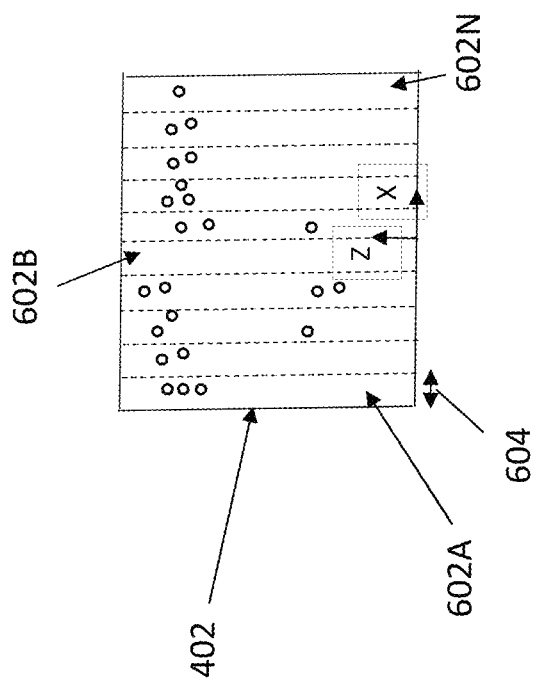
FIG. 6 is a diagram showing the 2D plane of FIG. 5 with in-plane points quantized into bins, according to some embodiments.

FIG. 6 is a diagram showing the plane 402 with in-plane points quantized into bins, according to some embodiments. The plane 402 includes bins 602A, 602B through 602N, collectively referred to as bins 602, which share a common bin size 604. For illustrative purposes, FIGS. 4A-4B also show the bin size 604 to illustrate conceptually the bin in 3D space (and the corresponding 3D points that are projected to 2D and mapped to the bin). As shown, some bins 602 may not include any 3D points, such as bin 602B.

At step 212, the machine vision system determines a representative 2D position (e.g., (x,z) position) for each of the 2D bins based on the 2D points in each bin. According to some embodiments, the techniques can use a threshold to determine whether to include the 2D points of a particular bin (e.g., which can further influence whether the bin is used to determine a portion of the profile). For example, if the machine vision system determines that the number of 2D points of one or more 2D bins is less than a threshold, then the machine vision system can zero-out the 2D points of those bins so that the bins are not associated with any 2D points. For example, referring to FIG. 6, if the minimum number of points is set to two (2), bin 602N can be filtered out from subsequent processing since it contains only one 2D point.

Various techniques can be used to determine the representative 2D position of each bin (e.g., each non-empty bin). For example, the representative 2D position can be determined based on an average, mean, standard deviation, and/or the like, of the 2D points of the bin. As another example, the representative 2D position can be determined based on one or more maximum point values, minimum point values, and/or the like, of the 2D points of the bin. As a further example, the representative 2D position can be determined by clustering the points of a 2D bin and determining the representative 2D position based on the clusters.

Figure 7:
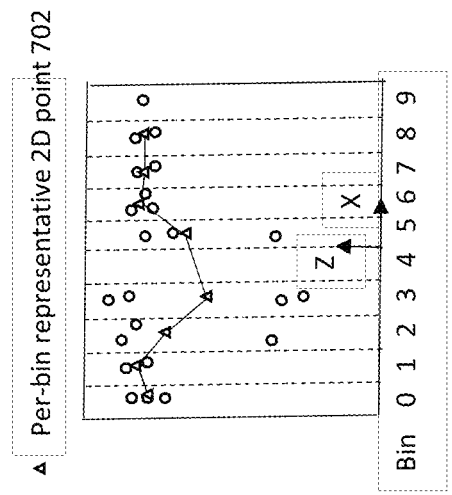
FIG. 7 is a diagram showing an exemplary set of representative 2D positions determined by averaging the values of the 2D points of each bin from FIG. 6, according to some embodiments.
Figure 8:
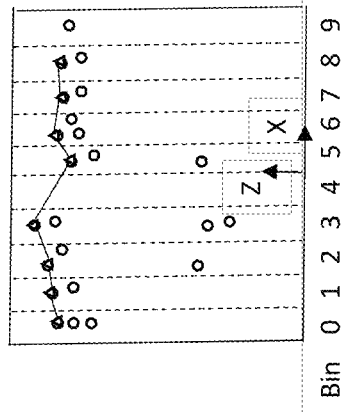
FIG. 8 is a diagram showing an exemplary set of representative 2D positions determined by selecting the 2D point of each bin of FIG. 6 with a maximum Z value, according to some embodiments.
Figure 9:
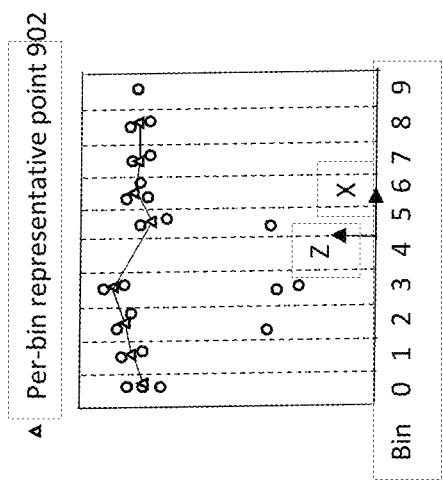
FIG. 9 is a diagram showing an exemplary set of representative 2D positions determined by clustering the 2D points from FIG. 6, according to some embodiments.

FIGS. 7-9 are diagrams that illustrate different techniques that can be used to determine the representative 2D positions, according to some embodiments. According to some embodiments, the representative 2D point can be determined by averaging the coordinate values of the 2D points in a bin. FIG. 7 is a diagram showing an exemplary set of representative 2D positions 702 determined by averaging the values of the 2D points of FIG. 6, according to some embodiments. For example, the machine vision system can be configured to run an average mode that averages the X and Z values of the 2D points in each bin 0 through 9 to determine the representative 2D points 702 that each have an X value equal to the average of the X values and a Z value equal to the average of the Z values.

As another example, some embodiments can select the 2D point with a maximum value of an axis (e.g., the second axis) as the representative 2D position. FIG. 8 is a diagram showing an exemplary set of representative 2D positions 802 determined by selecting the 2D point of each bin of FIG. 6 with a maximum Z value, according to some embodiments. In this example, the representative 2D positions 802 of each bin are set equal to the X and Z values of the 2D point with the maximum Z value in each bin.

As a further example, some embodiments can cluster the 2D points of each bin to determine the representative 2D position. For example, the machine vision system can group the set of 2D points into one or more clusters of 2D points with distances between values of an axis of the 2D points (e.g., the Z axis) of each cluster within a separation threshold, while distances between the values of the 2D points of different clusters are greater than the separation threshold. The machine vision system can remove any clusters with less than a threshold minimum number of 2D points to generate a remaining set of one or more clusters. The machine vision system can determine a maximum cluster of the one or more remaining clusters by determining which of the remaining clusters has the 2D point with a maximum coordinate value (e.g., along the second axis). The machine vision system can average the 2D points of the cluster with that 2D point average to determine the representative 2D position.

FIG. 9 is a diagram showing an exemplary set of representative 2D positions 902 determined by clustering the 2D points, according to some embodiments. According to some embodiments, the separation threshold can be set based on the bin size. As an illustrative example, referring to FIG. 9, the 2D points of a bin are grouped into clusters based on their Z components such that: 1) different clusters have their Z-distances larger than the separation threshold; and 2) for each cluster the Z-distance between any pair of Z-adjacent points (after Z-based sorting) is not larger than the separation threshold. For this example, the separation threshold is determined as the maximum of the thickness of the 3D region of interest and a connectivity distance used when generating the profile line (e.g., discussed further in conjunction with step 214). A cluster can be considered a qualified cluster if it contains at least a threshold minimum number of points in the bin. The machine vision system can select the qualified cluster with the largest Z component. The machine vision system can determine the average of the points of the selected qualified cluster as the representative point of the bin.

As noted herein, the rectangular box examples are provided for illustrative purposes but are not intended to limit the techniques described herein. Other embodiments may modify one or more aspects of these examples, such as by using different shapes, different region coordinate systems, and/or different dispositions of the 3D region with respect to the region coordinate system. The techniques described herein can therefore be modified accordingly. As a simple example, if the cutting rectangle flips in its Y direction, the maximum mode and clustering mode can extract minimum Z values/profiles instead of maximum Z values/profiles.

At step 214, the machine vision system connects each of the representative 2D positions to neighboring representative 2D positions to generate the 2D profile. According to some embodiments, the techniques can connect the adjacent representative 2D positions of occupied bins disposed along an axis (e.g., the X axis) to form one or more polylines. Two occupied bins can be considered adjacent if their bins are next to each other and/or there exist only un-occupied bins between them. Two adjacent bins can be considered to belong to a same polyline if the distance along the first axis (e.g., X axis) between their representative 2D positions is not greater than a specified connectivity distance threshold.

For example, the connectivity distance threshold can be set to larger than twice the bin size (e.g., so that bin 3 and bin 5 are connected in each of the examples shown in FIGS. 7-9).

In some embodiments, such as shown with bin 4 in FIGS. 7-9, some bins may not be occupied by any 2D points and/or the 2D points in the bin may be removed and/or ignored (e.g., if there are not a sufficient number of 2D points in the bin). Therefore, in some embodiments there can be empty bins, or gaps, between occupied bins. In some embodiments, the machine vision system can be configured to connect occupied bins across gaps. For example, the machine vision system connects bins 3 and 5 through empty bin 4 as shown in FIGS. 7-9. In some embodiments, the machine vision system can use a threshold gap distance to determine whether to connect occupied bins through empty bins. For example, the threshold can be two empty bins, three empty bins, five empty bins, etc. If the machine vision system determines the gap is above the threshold gap distance, then the machine vision system can be configured to not connect the occupied bins (e.g., and to create two separate 2D profiles), whereas if the gap is below the threshold gap distance, then the machine vision system can be configured to connect the occupied bins (e.g., to continue the 2D profile across the gap).

Figure 10:
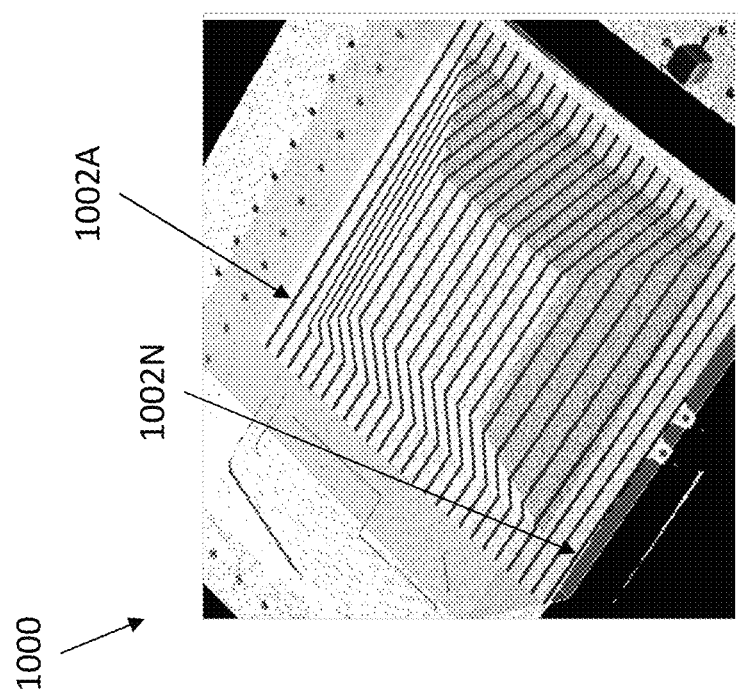
FIG. 10 shows an example of profile results extracted from a series of cutting rectangles that are evenly distributed along the Y direction of a box region, according to some embodiments.

According to some embodiments, the techniques can be used to generate profiles along objects. For example, for a box, the techniques can generate evenly distributed cutting rectangles along the box's Y direction, with each rectangle used to generate an associated profile being a parallel copy of the box's front XZ face. FIG. 10 shows an example of profile results 1000 extracted from a series of cutting rectangles that are evenly distributed along the Y direction of a box region, according to some embodiments. As shown, for each cutting rectangle, an associated profile 1002A through 1002N is generated along the Y direction.

Figure 11:
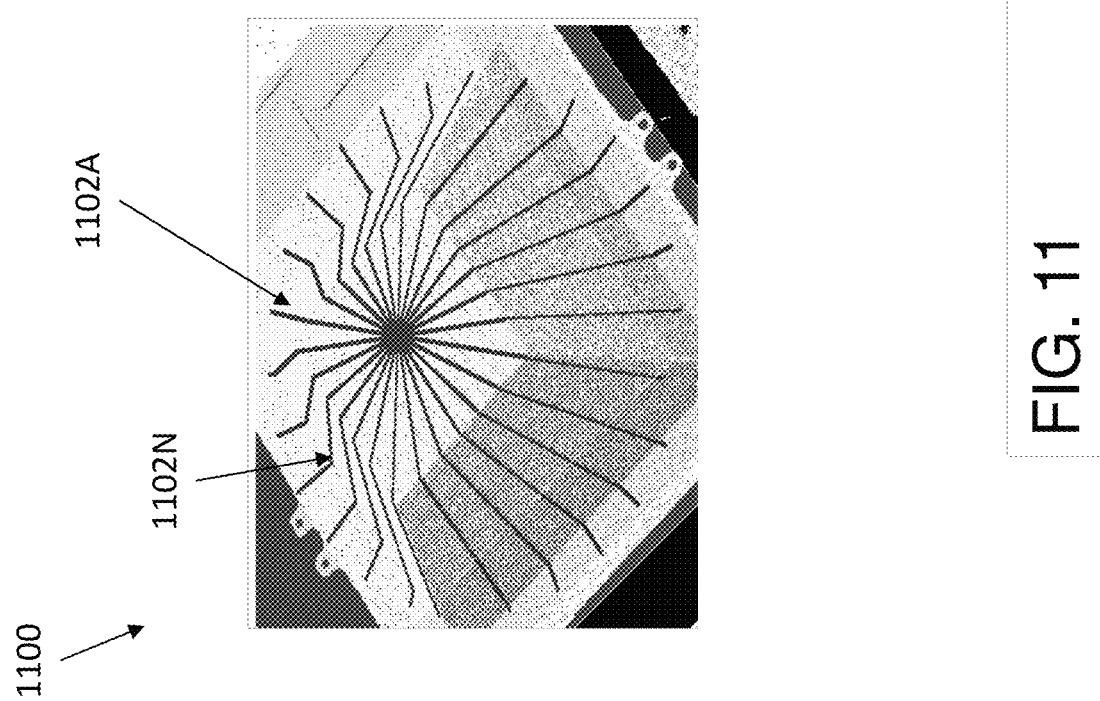
FIG. 11 shows an example of profile results extracted from a series of cutting rectangles that are evenly distributed along the angular direction of a frustum, according to some embodiments.

As another example, the techniques can generate evenly distributed cutting planes or rectangles along an object's angular direction, such that the profiles are arranged radially from the center of the object (e.g., such that the profile regions are arranged in a cylindrical fashion). In such examples, each rectangle can be parallel to the axis of the object and its interior Y side aligned with the axis and the outer Y side on the surface. As a further example, the techniques can be used to generate profiles using a set of arbitrary rectangles. FIG. 11 shows an example of profile results 1100 extracted from a series of cutting rectangles that are evenly distributed along the angular direction of a frustum, according to some embodiments. As shown, for each cutting rectangle, an associated profile 1102A through 1102N is generated along the angular direction.

Figure 12:
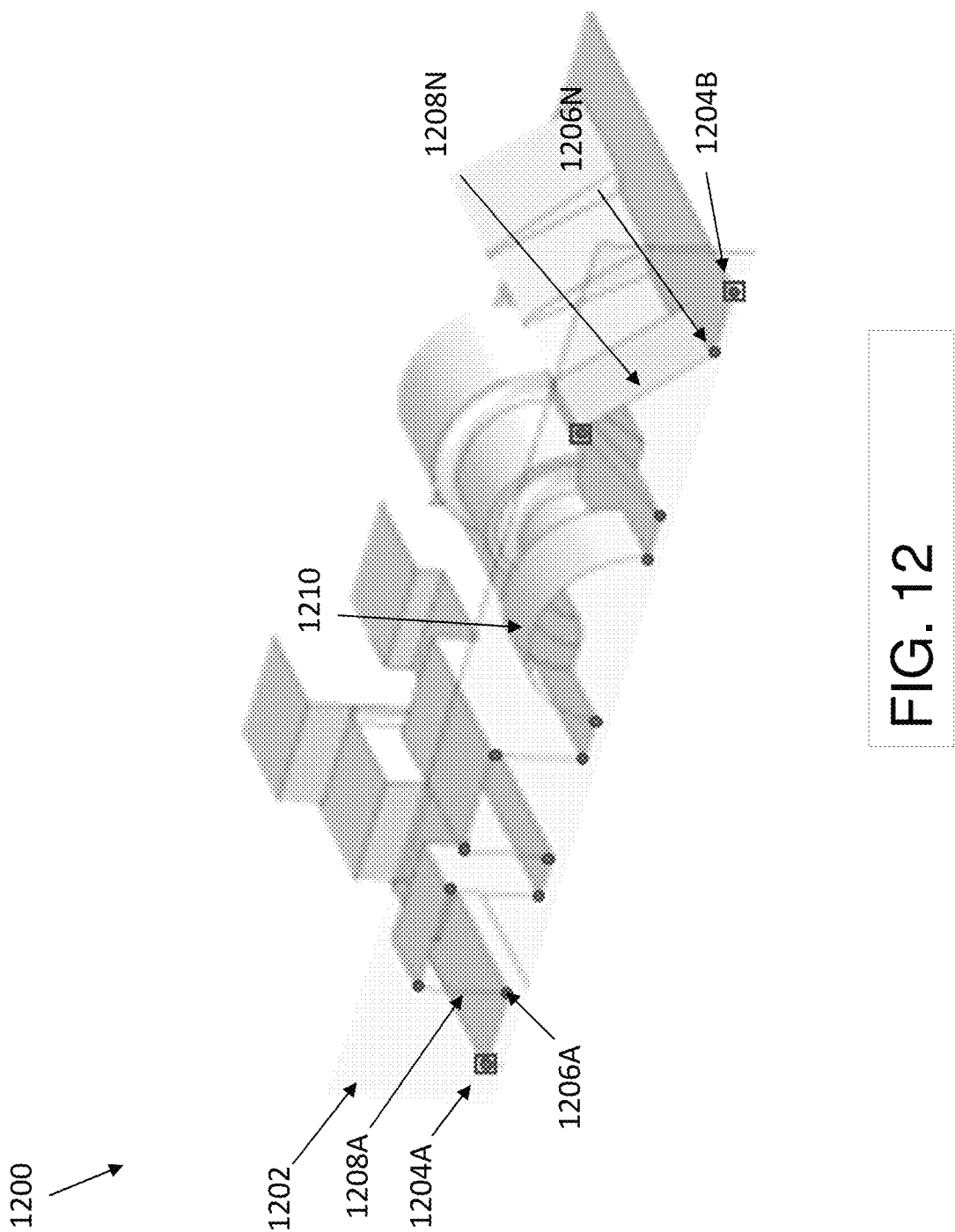
FIG. 12 is a diagram showing exemplary variant features derived from a profile, according to some embodiments.
Figure 13:
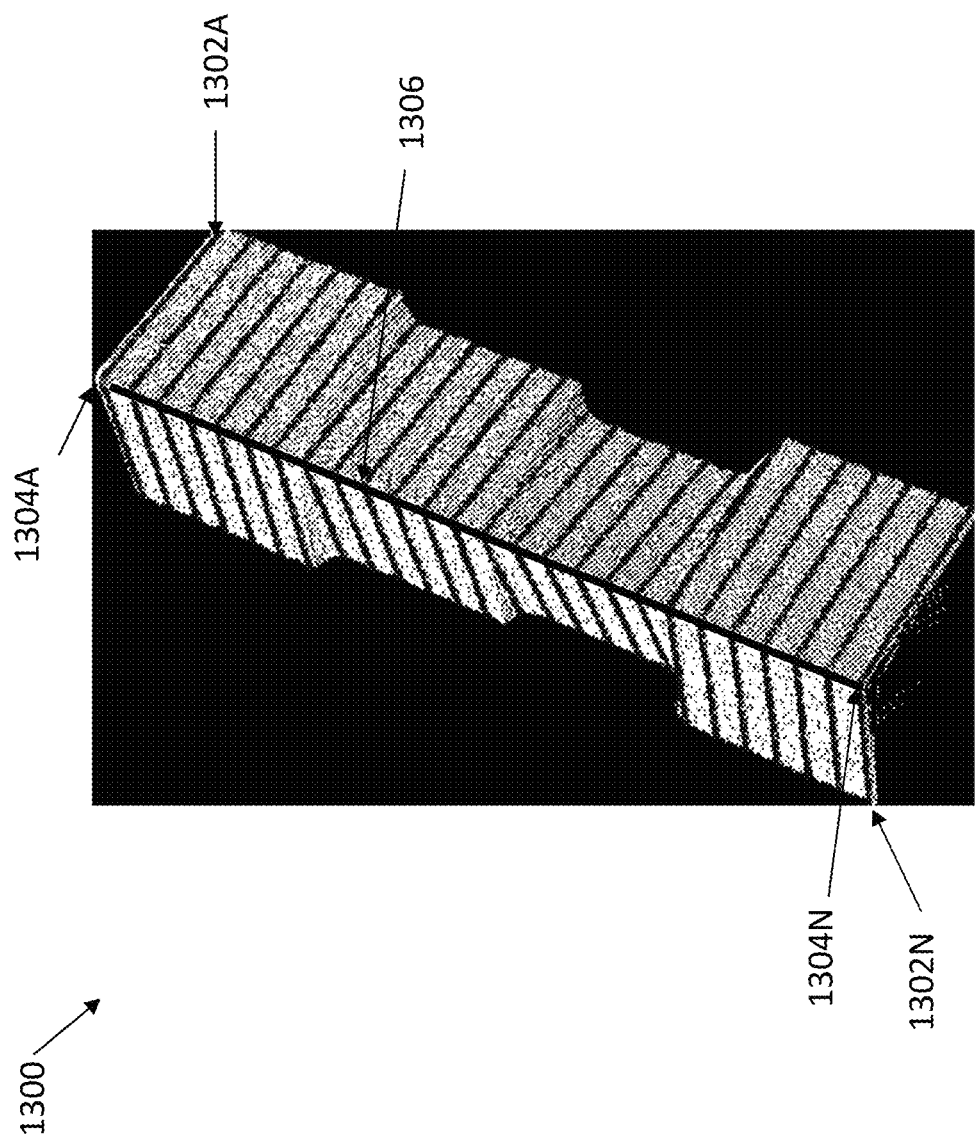
FIG. 13 is a diagram showing an example of a 3D line extracted using corner features that are detected from a sequence of extracted profiles, according to some embodiments.
Figure 14:
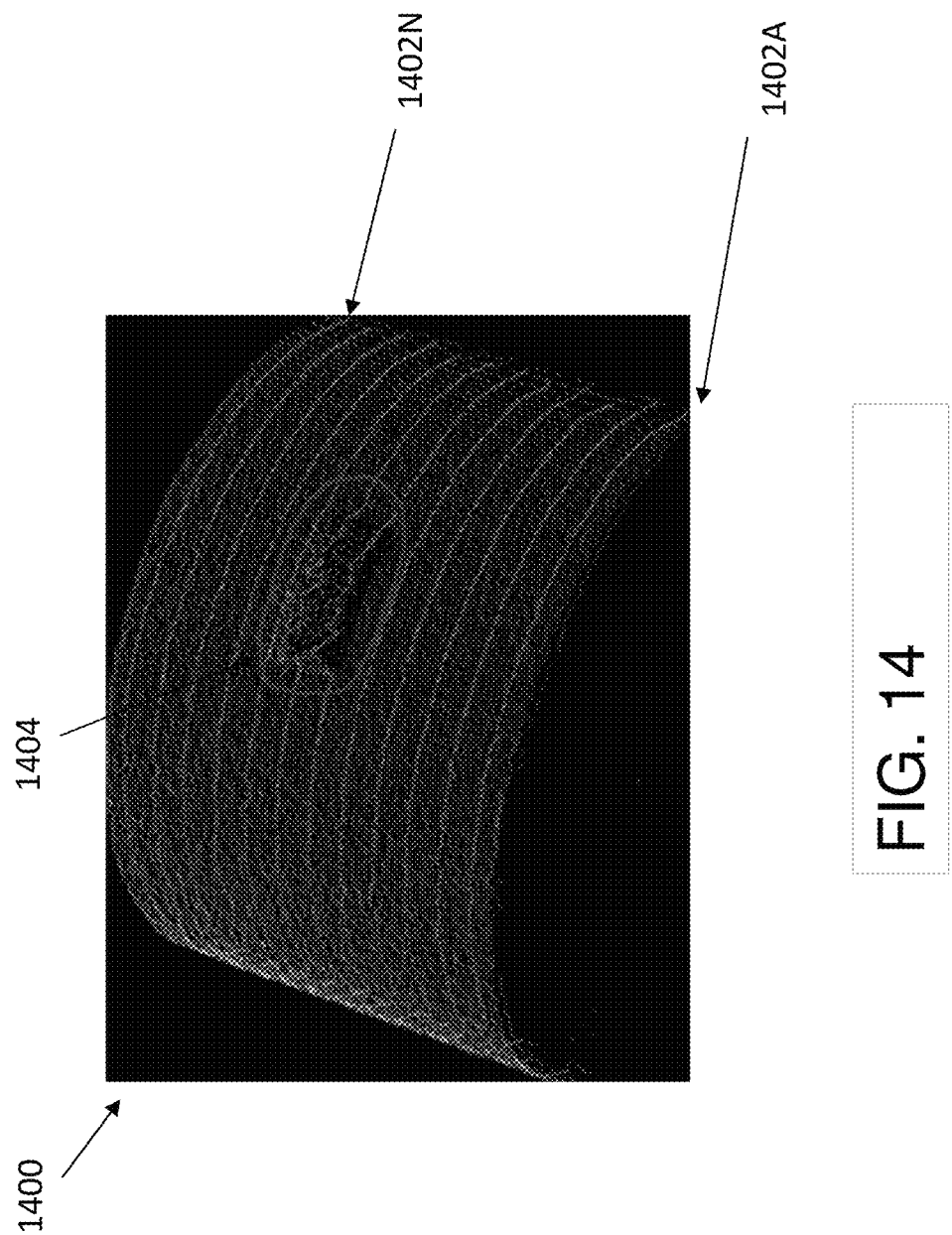
FIG. 14 is a diagram showing an example of a surface defect detected by monitoring the variation of a successive sequence of extracted profiles, according to some embodiments.

The profiles described herein can be used for various machine vision tools. Each profile can be used as a representation that provides a summarized view of the surface points of an object, such as the surface points that are on or near a cutting plane. The profiles can be used to measure, for example, features, dimensions and/or other aspects of a captured object, such as corner points, the perimeter of the object, an area of the object, and/or the like. As another example, a series of profiles can be used to determine information about the object, such as 3D features (e.g., 3D perimeter lines) of the object, the volume of some and/or a portion of the object, defects of the object, and/or the like. As shown in the diagram 1200 of FIG. 12, variant features can be derived from a profile 1202, including in this example the corner positions 1206A through 1206N (e.g., determined with large slope changes in both sides), extreme positions 1204A and 1204B (e.g., with maximum or minimum X or Z positions), linear segments 1208A through 1208N, and circular sections 1210. Such derived features can be useful for 3D vision applications, such as inspection applications. FIG. 13 is a diagram 1300 of an example of a 3D line 1306 that is extracted by line fitting on the corner features 1304A through 1304N that are detected from a sequence of associated extracted profiles 1302A through 1302N. By taking into account the area of each profile on its cutting plane and the thickness of the cut, the techniques can also estimate the volume covered by the surface. FIG. 14 is a diagram showing an application example of detecting surface defects 1404 by monitoring the variation of a successive sequence of profiles 1402A through 1402N.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

Various aspects are described in this disclosure, which include, but are not limited to, the following aspects:

1. A computerized method for determining a two-dimensional (2D) profile of a portion of a three-dimensional (3D) point cloud, the method comprising:
  receiving data indicative of a 3D point cloud comprising a plurality of 3D points;
  determining a 3D region of interest in the 3D point cloud, wherein the 3D region of interest comprises a width along a first axis, a height along a second axis, and a depth along a third axis;
  determining a set of 3D points of the plurality of 3D points that each comprises a 3D location within the 3D region of interest;
  representing the set of 3D points as a set of 2D points based on coordinate values of the first and second axes of set of the 3D points;
  grouping the set of 2D points into a plurality of 2D bins arranged along the first axis, wherein each 2D bin comprises a bin width;
  determining, for each of the plurality of 2D bins, a representative 2D position based on the associated set of 2D points; and
  connecting each of the representative 2D positions to neighboring representative 2D positions to generate the 2D profile.

2. The method of 1, further comprising:
  creating a 3D region coordinate system comprising the first axis, the second axis, and the third axis, wherein an origin of the 3D region coordinate system is disposed at a middle of the width and depth of the 3D region, and the height of the 3D region starts at the origin.

3. The method of 2, further comprising mapping points from a coordinate system of the 3D point cloud to the 3D region coordinate system.

4. The method of 1-3, wherein representing the set of 3D points as the set of 2D points comprises representing the 3D points in a 2D plane comprising a first dimension equal to the width and a second dimension equal to the height, wherein the first dimension extends along the first axis and the second dimension extends along the second axis.

5. The method of 4, wherein representing the set of 3D points as the set of 2D points comprises setting each value of the third axis of the set of 3D points to zero.

6. The method of 4, wherein the plurality of 2D bins are arranged side-by-side along the first axis within the first dimension of the 2D plane.

7. The method of 1-6, wherein determining a representative 2D position for each of the plurality of 2D bins comprises:
  determining the set of 2D points of one or more 2D bins of the plurality of 2D bins is less than a threshold; and
  setting the set of 2D points of the one or more 2D bins to an empty set.

8. The method of 1-7, wherein determining the representative 2D position for each of the plurality of 2D bins comprises determining an average of the set of 2D points of each bin.

9. The method of 1-8, wherein determining the representative 2D position for each of the plurality of 2D bins comprises selecting a 2D point of the associated set of 2D points with a maximum value of the second axis as the representative 2D position.

10. The method of 1-9, wherein determining the representative 2D position for each of the plurality of 2D bins comprises, for each 2D bin:
  grouping the set of 2D points into one or more clusters of 2D points with distances between values of the second axis of the 2D points of each cluster within a separation threshold, wherein distances between the values of the second axis of the 2D points of different clusters are greater than the separation threshold;
  removing any clusters with less than a threshold minimum number of 2D points to generate a remaining set of one or more clusters;
  determining a maximum cluster of the one or more remaining clusters comprising determining which of the one or more remaining clusters comprises a 2D point with a maximum coordinate along the second axis; and
  averaging the 2D points of the maximum cluster to determine the representative 2D position.

11. The method of 1-10, wherein determining the representative 2D position for each of the plurality of 2D bins comprises determining the representative 2D position only for 2D bins of the plurality of 2D bins with non-empty sets of 2D points.

12. A non-transitory computer-readable media comprising instructions that, when executed by one or more processors on a computing device, are operable to cause the one or more processors to determine a two-dimensional (2D) profile of a portion of a three-dimensional (3D) point cloud, comprising:
  receiving data indicative of a 3D point cloud comprising a plurality of 3D points;

determining a 3D region of interest in the 3D point cloud, wherein the 3D region of interest comprises a width along a first axis, a height along a second axis, and a depth along a third axis;

determining a set of 3D points of the plurality of 3D points that each comprises a 3D location within the 3D region of interest;

representing the set of 3D points as a set of 2D points based on coordinate values of the first and second axes of set of the 3D points;

grouping the set of 2D points into a plurality of 2D bins arranged along the first axis, wherein each 2D bin comprises a bin width;

determining, for each of the plurality of 2D bins, a representative 2D position based on the associated set of 2D points; and connecting each of the representative 2D positions to neighboring representative 2D positions to generate the 2D profile.

13. The non-transitory computer-readable media of 12, wherein representing the set of 3D points as the set of 2D points comprises representing the 3D points in a 2D plane comprising a first dimension equal to the width and a second dimension equal to the height, wherein the first dimension extends along the first axis and the second dimension extends along the second axis.

14. The non-transitory computer-readable media of 12-13, wherein determining the representative 2D position for each of the plurality of 2D bins comprises determining an average of the set of 2D points of each bin.

15. The non-transitory computer-readable media of 12-14, wherein determining the representative 2D position for each of the plurality of 2D bins comprises selecting a 2D point of the associated set of 2D points with a maximum value of the second axis as the representative 2D position.

16. The non-transitory computer-readable media of 12-15, wherein determining the representative 2D position for each of the plurality of 2D bins comprises, for each 2D bin:

grouping the set of 2D points into one or more clusters of 2D points with distances between values of the second axis of the 2D points of each cluster within a separation threshold, wherein distances between the values of the second axis of the 2D points of different clusters are greater than the separation threshold;

removing any clusters with less than a threshold minimum number of 2D points to generate a remaining set of one or more clusters;

determining a maximum cluster of the one or more remaining clusters comprising determining which of the one or more remaining clusters comprises a 2D point with a maximum coordinate along the second axis; and averaging the 2D points of the maximum cluster to determine the representative 2D position.

17. A system comprising a memory storing instructions, and at least one processor configured to execute the instructions to perform:

receiving data indicative of a 3D point cloud comprising a plurality of 3D points;

determining a 3D region of interest in the 3D point cloud, wherein the 3D region of interest comprises a width along a first axis, a height along a second axis, and a depth along a third axis;

determining a set of 3D points of the plurality of 3D points that each comprises a 3D location within the 3D region of interest;

representing the set of 3D points as a set of 2D points based on coordinate values of the first and second axes of set of the 3D points;

grouping the set of 2D points into a plurality of 2D bins arranged along the first axis, wherein each 2D bin comprises a bin width;

determining, for each of the plurality of 2D bins, a representative 2D position based on the associated set of 2D points; and connecting each of the representative 2D positions to neighboring representative 2D positions to generate the 2D profile.

18. The system of 17, wherein representing the set of 3D points as the set of 2D points comprises representing the 3D points in a 2D plane comprising a first dimension equal to the width and a second dimension equal to the height, wherein the first dimension extends along the first axis and the second dimension extends along the second axis.

19. The system of 17-18, wherein determining the representative 2D position for each of the plurality of 2D bins comprises determining an average of the set of 2D points of each bin.

20. The system of 17-19, wherein determining the representative 2D position for each of the plurality of 2D bins comprises, for each 2D bin:

grouping the set of 2D points into one or more clusters of 2D points with distances between values of the second axis of the 2D points of each cluster within a separation threshold, wherein distances between the values of the second axis of the 2D points of different clusters are greater than the separation threshold;

removing any clusters with less than a threshold minimum number of 2D points to generate a remaining set of one or more clusters;

determining a maximum cluster of the one or more remaining clusters comprising determining which of the one or more remaining clusters comprises a 2D point with a maximum coordinate along the second axis; and averaging the 2D points of the maximum cluster to determine the representative 2D position.

The invention claimed is:

1. A computerized method for determining two-dimensional (2D) profiles of a portion of a three-dimensional (3D) point cloud of an object, the method comprising:

receiving data indicative of the 3D point cloud of the object comprising a plurality of 3D points;

determining a 3D region of interest in the 3D point cloud;

determining a plurality of different 3D subregions in the 3D region of interest, wherein each of the plurality of 3D subregions comprises a width along a corresponding first axis, a height along a corresponding second axis, and a depth along a corresponding third axis;

determining a plurality of sets of 3D points of the plurality of 3D points corresponding to the plurality of 3D subregions, wherein for each set of the plurality of sets of 3D points, each 3D point comprises a 3D location within the 3D subregion corresponding to the set of 3D points; and for each set of the plurality of sets of 3D points:

representing the set of 3D points from three dimensions to only two dimensions as a set of 2D points based on coordinate values of the corresponding first and second axes of the set of 3D points;

grouping the set of 2D points into a plurality of 2D bins arranged along the corresponding first axis based on coordinate values of the corresponding first axis, wherein each 2D bin comprises a bin width;

determining, for each of the plurality of 2D bins, a representative 2D position based on the coordinate values of the corresponding second axis of the associated set of 2D points, wherein each representative 2D position includes associated coordinate values of the corresponding first and second axes; and connecting each of the representative 2D positions to neighboring representative 2D positions to generate a 2D profile of the object along the corresponding first and second axes.

2. The method of claim 1, further comprising, for each set of the plurality of sets of 3D points:

creating a 3D subregion coordinate system comprising the corresponding first axis, the corresponding second axis, and the corresponding third axis, wherein an origin of the 3D subregion coordinate system is disposed at a middle of the width and depth of the 3D subregion, and the height of the 3D subregion starts at the origin.

3. The method of claim 2, further comprising, for each set of the plurality of sets of 3D points:

mapping points from a coordinate system of the 3D point cloud to the 3D subregion coordinate system.

4. The method of claim 1, wherein representing the set of 3D points as the set of 2D points comprises representing the 3D points in a 2D plane comprising a first dimension equal to the width and a second dimension equal to the height, wherein the first dimension extends along the corresponding first axis and the second dimension extends along the corresponding second axis.

5. The method of claim 4, wherein representing the set of 3D points as the set of 2D points comprises setting each value of the corresponding third axis of the set of 3D points to zero.

6. The method of claim 4, wherein the plurality of 2D bins are arranged side-by-side along the corresponding first axis within the first dimension of the 2D plane.

7. The method of claim 1, wherein determining a representative 2D position for each of the plurality of 2D bins comprises:

determining the set of 2D points of one or more 2D bins of the plurality of 2D bins is less than a threshold; and setting the set of 2D points of the one or more 2D bins to an empty set.

8. The method of claim 1, wherein determining the representative 2D position for each of the plurality of 2D bins comprises determining an average of the set of 2D points of each bin.

9. The method of claim 1, wherein determining the representative 2D position for each of the plurality of 2D bins comprises selecting a 2D point of the associated set of 2D points with a maximum value of the corresponding second axis as the representative 2D position.

10. The method of claim 1, wherein determining the representative 2D position for each of the plurality of 2D bins comprises, for each 2D bin:

grouping the set of 2D points into one or more clusters of 2D points with distances between values of the corresponding second axis of the 2D points of each cluster within a separation threshold, wherein distances between the values of the corresponding second axis of the 2D points of different clusters are greater than the separation threshold;

removing any clusters with less than a threshold minimum number of 2D points to generate a remaining set of one or more clusters;

determining a maximum cluster of the one or more remaining clusters comprising determining which of the one or more remaining clusters comprises a 2D point with a maximum coordinate along the corresponding second axis; and averaging the 2D points of the maximum cluster to determine the representative 2D position.

11. The method of claim 1, wherein determining the representative 2D position for each of the plurality of 2D bins comprises determining the representative 2D position only for 2D bins of the plurality of 2D bins with non-empty sets of 2D points.

12. The method of claim 1, further comprising:

determining a surface defect of the object based, at least in part, on a successive sequence of 2D profiles of the 2D profiles generated for the plurality of sets of 3D points.

13. The method of claim 1, further comprising:

determining a 3D feature of the object based, at least in part, on a series of 2D profiles of the 2D profiles generated for the plurality of sets of 3D points, the 3D feature of the object comprising at least one of a 3D perimeter line, a volume of at least a portion of the object, or an object defect.

14. The method of claim 1, wherein receiving the data indicative of the 3D point cloud of the object comprises:

moving the object through a field of view of a camera; and generating, via the camera, a digital image of the object passing through the field of view of the camera.

15. A non-transitory computer-readable media comprising instructions that, when executed by one or more processors on a computing device, are operable to cause the one or more processors to determine two-dimensional (2D) profiles of a portion of a three-dimensional (3D) point cloud of an object, comprising:

receiving data indicative of the 3D point cloud of the object comprising a plurality of 3D points;

determining a 3D region of interest in the 3D point cloud;

determining a plurality of different 3D subregions of interest in the 3D point cloud region of interest, wherein each of the plurality of 3D subregions of interest comprises a width along a corresponding first axis, a height along a corresponding second axis, and a depth along a corresponding third axis;

determining a plurality of sets of 3D points of the plurality of 3D points corresponding to the plurality of 3D subregions, wherein for each set of the plurality of sets of 3D points, each 3D point comprises a 3D location within the 3D region subregion of interest corresponding to the set of 3D points; and for each set of the plurality of sets of 3D points:

representing the set of 3D points from three dimensions to only two dimensions as a set of 2D points based on coordinate values of the corresponding first and second axes of the set of 3D points;

grouping the set of 2D points into a plurality of 2D bins arranged along the corresponding first axis based on coordinate values of the corresponding first axis, wherein each 2D bin comprises a bin width;

determining, for each of the plurality of 2D bins, a representative 2D position based on the coordinate values of the corresponding second axis of the associated set of 2D points, wherein each representative 2D position includes associated coordinate values of the corresponding first and second axes; and connecting each of the representative 2D positions to neighboring representative 2D positions to generate a 2D profile of the object along the corresponding first and second axes.

16. The non-transitory computer-readable media of claim 15, wherein representing the set of 3D points as the set of 2D points comprises representing the 3D points in a 2D plane comprising a first dimension equal to the width and a second dimension equal to the height, wherein the first dimension extends along the corresponding first axis and the second dimension extends along the corresponding second axis.

17. The non-transitory computer-readable media of claim 15, wherein determining the representative 2D position for each of the plurality of 2D bins comprises determining an average of the set of 2D points of each bin.

18. The non-transitory computer-readable media of claim 15, wherein determining the representative 2D position for each of the plurality of 2D bins comprises selecting a 2D point of the associated set of 2D points with a maximum value of the corresponding second axis as the representative 2D position.

19. The non-transitory computer-readable media of claim 15, wherein determining the representative 2D position for each of the plurality of 2D bins comprises, for each 2D bin:
grouping the set of 2D points into one or more clusters of 2D points with distances between values of the corresponding second axis of the 2D points of each cluster within a separation threshold, wherein distances between the values of the corresponding second axis of the 2D points of different clusters are greater than the separation threshold;
removing any clusters with less than a threshold minimum number of 2D points to generate a remaining set of one or more clusters;
determining a maximum cluster of the one or more remaining clusters comprising determining which of the one or more remaining clusters comprises a 2D point with a maximum coordinate along the corresponding second axis; and
averaging the 2D points of the maximum cluster to determine the representative 2D position.

20. A system comprising a memory storing instructions, and at least one processor configured to execute the instructions to perform:
receiving data indicative of the 3D point cloud of the object comprising a plurality of 3D points;
determining a 3D region of interest in the 3D point cloud;
determining a plurality of different 3D subregions in the 3D region of interest, wherein each of the plurality of 3D subregions comprises a width along a corresponding first axis, a height along a corresponding second axis, and a depth along a corresponding third axis;
determining a plurality of sets of 3D points of the plurality of 3D points corresponding to the plurality of 3D subregions, wherein for each set of the plurality of sets of 3D points, each 3D point comprises a 3D location within the 3D region subregion corresponding to the set of 3D points; and
for each set of the plurality of sets of 3D points:
representing the set of 3D points from three dimensions to only two dimensions as a set of 2D points based on coordinate values of the corresponding first and second axes of the set of 3D points;
grouping the set of 2D points into a plurality of 2D bins arranged along the corresponding first axis based on coordinate values of the corresponding first axis, wherein each 2D bin comprises a bin width;
determining, for each of the plurality of 2D bins, a representative 2D position based on the coordinate values of the corresponding second axis of the associated set of 2D points, wherein each representative 2D position includes associated coordinate values of the corresponding first and second axes; and
connecting each of the representative 2D positions to neighboring representative 2D positions to generate a 2D profile of the object along the corresponding first and second axes.

21. The system of claim 20, wherein representing the set of 3D points as the set of 2D points comprises representing the 3D points in a 2D plane comprising a first dimension equal to the width and a second dimension equal to the height, wherein the first dimension extends along the corresponding first axis and the second dimension extends along the corresponding second axis.

22. The system of claim 20, wherein determining the representative 2D position for each of the plurality of 2D bins comprises determining an average of the set of 2D points of each bin.

23. The system of claim 20, wherein determining the representative 2D position for each of the plurality of 2D bins comprises, for each 2D bin:
grouping the set of 2D points into one or more clusters of 2D points with distances between values of the corresponding second axis of the 2D points of each cluster within a separation threshold, wherein distances between the values of the corresponding second axis of the 2D points of different clusters are greater than the separation threshold;
removing any clusters with less than a threshold minimum number of 2D points to generate a remaining set of one or more clusters;
determining a maximum cluster of the one or more remaining clusters comprising determining which of the one or more remaining clusters comprises a 2D point with a maximum coordinate along the corresponding second axis; and
averaging the 2D points of the maximum cluster to determine the representative 2D position.

* * * * *

UNITED STATES PATENT AND TRADEMARK OFFICE
CERTIFICATE OF CORRECTION

PATENT NO. : 11,893,744 B2
APPLICATION NO. : 17/316417
DATED : February 6, 2024
INVENTOR(S) : Hongwei Zhu et al.

It is certified that error appears in the above-identified patent and that said Letters Patent is hereby corrected as shown below:

In the Claims

Claim 15, at Column 20, Lines 41-44, "subregions of interest in the 3D point cloud region of interest, wherein each of the plurality of 3D subregions of interest" should read --subregions in the 3D region of interest, wherein each of the plurality of 3D subregions--.

Claim 15, at Column 20, Line 51, "3D region subregion of interest" should read --3D region subregion--.

Signed and Sealed this
Twelfth Day of March, 2024

Katherine Kelly Vidal
*Director of the United States Patent and Trademark Office*